(12) United States Patent
Her et al.

(10) Patent No.: US 11,217,166 B2
(45) Date of Patent: Jan. 4, 2022

(54) ELECTRONIC DEVICE AND DISPLAY FOR REDUCING LEAKAGE CURRENT

(71) Applicant: Samsung Electronics Co., Ltd., Gyeonggi-do (KR)

(72) Inventors: Yongkoo Her, Gyeonggi-do (KR); Hyunchang Shin, Gyeonggi-do (KR); Joongyu Lee, Gyeonggi-do (KR); Songhee Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/960,946

(22) PCT Filed: Jan. 21, 2019

(86) PCT No.: PCT/KR2019/000830
§ 371 (c)(1),
(2) Date: Jul. 9, 2020

(87) PCT Pub. No.: WO2019/143207
PCT Pub. Date: Jul. 25, 2019

(65) Prior Publication Data
US 2020/0342810 A1    Oct. 29, 2020

(30) Foreign Application Priority Data
Jan. 19, 2018 (KR) .......................... 10-2018-0007320

(51) Int. Cl.
*G09G 3/36* (2006.01)
*G09G 3/3233* (2016.01)
(Continued)

(52) U.S. Cl.
CPC .......... *G09G 3/3233* (2013.01); *G06F 21/32* (2013.01); *G06K 9/0004* (2013.01);
(Continued)

(58) Field of Classification Search
CPC .......... G09G 3/3233; G09G 2330/021; G09G 2354/00; G09G 3/3648; G06K 9/0004;
(Continued)

(56) References Cited

U.S. PATENT DOCUMENTS 8,698,167 B2    4/2014    Kim et al.
9,450,033 B2    9/2016    Suh et al.
(Continued)

FOREIGN PATENT DOCUMENTS

KR        10-1743268 B1       6/2017
KR    10-2017-0105272 A       9/2017
(Continued)

*Primary Examiner* — Abdul-Samad A Adediran
(74) *Attorney, Agent, or Firm* — Cha & Reiter, LLC

(57) ABSTRACT

According to an embodiment of the disclosure, an electronic device may include a display including at least one pixel including an organic light emitting diode and a transistor connected to an anode of the organic light emitting diode, a light emitting device to output light in an infrared band, and at least one control circuit configured to turn on the transistor included in at least some of the at least one pixel included in the display such that a leakage current, which is applied to the organic light emitting diode by the light in the infrared band, flows through the transistor, when the light in the infrared band is output through the light emitting device.

15 Claims, 10 Drawing Sheets

(51) Int. Cl.
  *G06F 21/32* (2013.01)
  *G06K 9/00* (2006.01)
  *G06Q 20/40* (2012.01)
  *H01L 27/32* (2006.01)
  *H01L 51/00* (2006.01)

(52) U.S. Cl.
  CPC ......... *G06K 9/00604* (2013.01); *G06Q 20/40* (2013.01); *G09G 3/3648* (2013.01); *H01L 27/3234* (2013.01); *H01L 27/3244* (2013.01); *H01L 51/0097* (2013.01); *G09G 2330/021* (2013.01); *G09G 2354/00* (2013.01); *H01L 2251/5338* (2013.01)

(58) Field of Classification Search
  CPC ................ G06K 9/00604; G06Q 20/40; H01L 27/3244; H01L 27/3234; H01L 51/0097; H01L 2251/5338
  See application file for complete search history.

(56) References Cited

U.S. PATENT DOCUMENTS

| | | |
|---|---|---|
| 9,846,455 B2 | 12/2017 | Kim |
| 2012/0138960 A1 | 6/2012 | Kim et al. |
| 2012/0176298 A1 | 7/2012 | Suh et al. |
| 2015/0076355 A1 | 3/2015 | Grauer et al. |
| 2015/0244960 A1 | 8/2015 | Grauer et al. |
| 2016/0050383 A1 | 2/2016 | Grauer et al. |
| 2016/0054823 A1 | 2/2016 | Kim |
| 2016/0150165 A1 | 5/2016 | Grauer et al. |
| 2016/0344965 A1 | 11/2016 | Grauer et al. |
| 2016/0365394 A1 | 12/2016 | Suh et al. |
| 2017/0154570 A1 | 6/2017 | Suh et al. |
| 2019/0102016 A1 | 4/2019 | Kim et al. |
| 2019/0318698 A1* | 10/2019 | Yamazaki ............ G09G 3/3648 |

FOREIGN PATENT DOCUMENTS

| | | |
|---|---|---|
| KR | 10-2017-0122693 A | 11/2017 |
| KR | 10-2017-0123578 A | 11/2017 |

\* cited by examiner

ELECTRONIC DEVICE AND DISPLAY FOR REDUCING LEAKAGE CURRENT

CROSS REFERENCE TO RELATED APPLICATIONS

This application is a National Phase Entry of PCT International Application No. PCT/KR2019/000830, which was filed on Jan. 21, 2019, and claims a priority to Korean Patent Application No. 10-2018-0007320, which was filed on Jan. 19, 2018, the contents of which are incorporated herein by reference.

TECHNICAL FIELD

Embodiments of the disclosure relate to a technology capable of reducing a leakage current flowing through a display.

BACKGROUND ART

As the demand for a larger screen is gradually increased, a technology associated with a full front display has been developed. For example, a smaller display has smaller icons, so a plurality of icons are simultaneously selected regardless of a user intent. In this case, an application irrelevant to the user intent may be selected or a user input may be ignored. Accordingly, recently, a technology has been developed to enlarge the size of a display as much as possible.

DISCLOSURE

Technical Problem

As the size of an area occupied by the display is gradually increased in the front surface of the electronic device, various parts have been disposed inside the electronic device instead of the front surface of the electronic device. For example, recently, an infrared light source, which has been used for a proximity sensor or an iris sensor, has been disposed inside the electronic device (e.g., a lower portion of the display).

However, the infrared ray output from the light source allows a transistor, which is included in the display, to cause the photoelectric effect, thereby causing the leakage current. The leakage current makes one area and another area of the display emitting light having mutually different intensities, or may cause the flickering phenomenon (e.g., a partial area of the display is flickered). The flickering phenomenon may cause damage to the sight of a user or cause the user to feel fatigue.

Embodiments of the disclosure are to provide an electronic device to solve the above problems and to resolve the issues raised herein.

Technical Solution

According to an embodiment of the disclosure, an electronic device may include a display including one or more pixels including an organic light emitting diode and a transistor connected to an anode of the organic light emitting diode, a light emitting device to output light in an infrared band, and at least one control circuit configured to turn on the transistor included in at least some of the one or more pixels included in the display such that a leakage current, which is applied to the organic light emitting diode by the light in the infrared band, flows through the transistor, when the light in the infrared band is output through the light emitting device.

According to an embodiment of the disclosure, an electronic device may include a display including one or more pixels including an organic light emitting diode and a transistor connected to an anode of the organic light emitting diode, a light emitting device to output light in an infrared band, and a PMIC electrically connected to at least some of the one or more pixels included in the display, and at least one control circuit configured to turn on the transistor, and to control the PMIC to initialize, through the transistor, a voltage value at a point at which the transistor is connected to the organic light emitting diode, when the light in the infrared band is to be output through the light emitting device.

According to an embodiment of the disclosure, an electronic device may include a display including one or more pixels including an organic light emitting diode and a transistor connected to an anode of the organic light emitting diode, a light emitting device to output light in an infrared band, a memory to store an instruction, and a control circuit. The instruction may cause the control circuit to when executed, turn on the transistor when the light in the infrared band is output through the light emitting device, based at least on receiving a user input for recognizing biometric information.

Advantageous Effects

According to embodiments of the disclosure, the leakage current may be reduced.

Besides, a variety of effects directly or indirectly understood through the disclosure may be provided.

MODE FOR INVENTION

Figure 1:
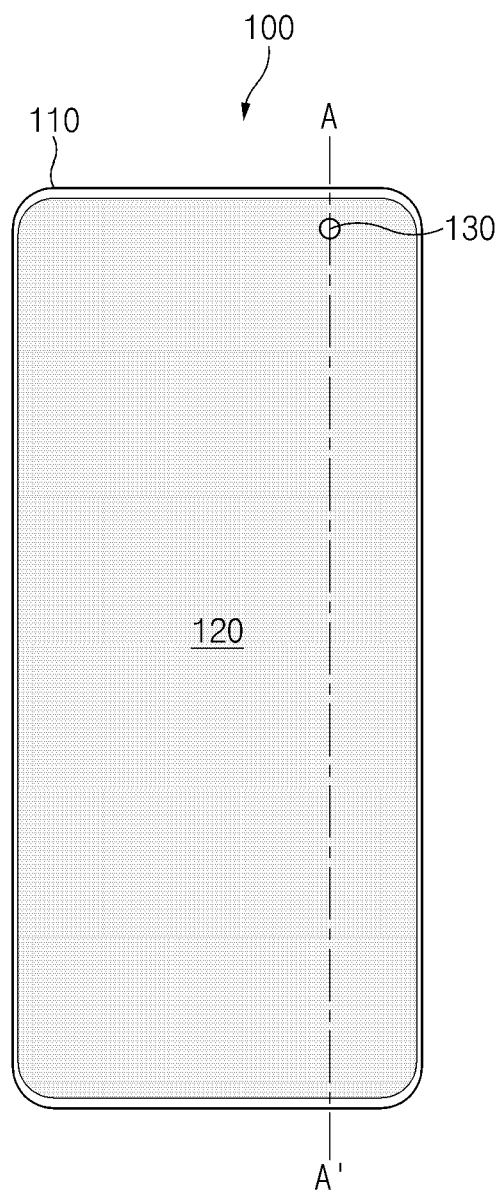
FIG. 1 illustrates an electronic device, according to an embodiment.

FIG. 1 illustrates an electronic device, according to an embodiment.

Referring to FIG. 1, an electronic device 100 may include a housing 110, a display 120, and a sensor 130.

The housing 110 may protect various parts (e.g., the display 120, or the sensor 130), which are included in the electronic device 100, from an external impact by forming the outer appearance of the electronic device 100.

The display 120 may be disposed inside the housing 110. The display 120 may output content (e.g., a text, an image, a video, an icon, a widget, or a symbol) or may receive a touch input (including a touch, a gesture, or a hovering) from a user.

The sensor 130 may include a light emitting device. The sensor 130 may emit light in a specified wavelength band through the light emitting device. For example, the sensor 130 may emit light in a visible light band through the light emitting device.

The sensor 130 may be disposed on a rear surface of an active area of the display 120. The sensor 130 may recognize biometric information of a user in response to a user input. For example, the sensor (or a light emitting device) 130 may emit light in an infrared band, when the user touches the display 120. The light emitted from the sensor 130 may be reflected from a user body (e.g., an iris or a finger), and may be incident on the electronic device 100. The electronic device 100 may unlock a locked screen or perform financial payment based on the reflected light. In the disclosure, the sensor 130 may be referred to as a proximity sensor, an iris sensor, and a fingerprint sensor.

In another embodiment, the sensor 130 (e.g., the proximity sensor) may sense whether an external object (e.g., the face of the user) is in proximity to the electronic device 100. For example, the sensor (or light emitting device) 130 may emit light in the infrared band. The light emitted from the sensor 130 may be reflected from the external object and may be incident on the electronic device 100. The electronic device 100 may detect whether the external object is in proximity to the electronic device 100, based on the reflected light. When it is determined that the external object is in proximity to the electronic device 100, the electronic device 100 may turn off the display 120.

In an electronic device according to a comparative example, pixels included in the display may erroneously emit light due to the light emitted from the sensor. For example, the light emitted from the sensor may cause a leakage current to flow in the pixel. Pixels disposed on the sensor may emit light brighter than other pixels, due to the leakage current. In addition, the pixels disposed on the sensor may be deteriorated due to the leakage current. However, according to an embodiment of the disclosure, the electronic device 100 may discharge the leakage current out of the pixels or may reduce an amount of leakage current. Accordingly, it is possible to prevent the pixels disposed on the sensor 130 from erroneously emitting light or being deteriorated.

Figure 2:
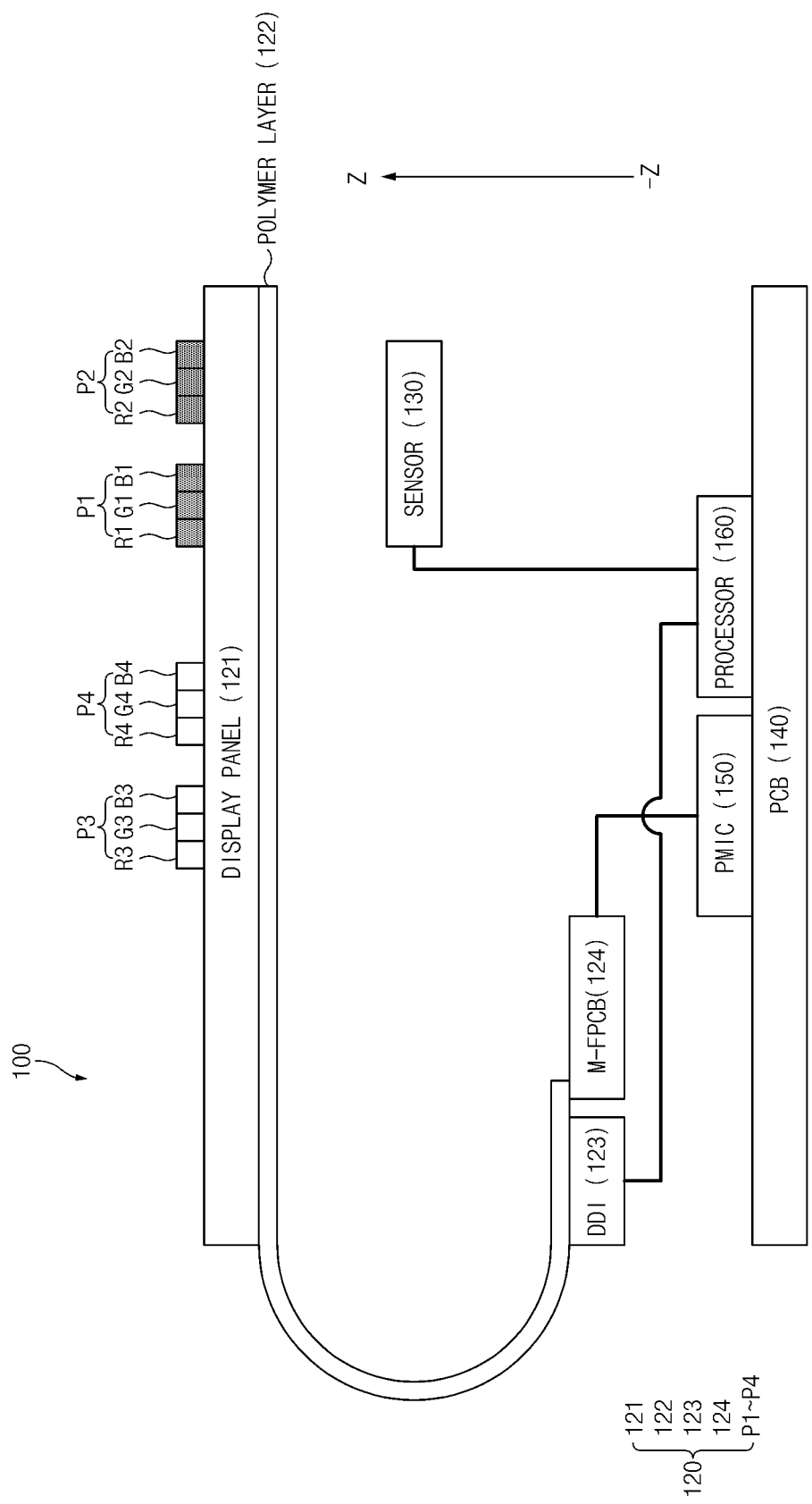
FIG. 2 illustrates a sectional view of an electronic device, according to an embodiment.

FIG. 2 illustrates a sectional view of an electronic device, according to an embodiment. FIG. 2 is a sectional view taken along line A-A' of the electronic device 100 illustrated in FIG. 1.

Referring to FIG. 2, the electronic device 100 includes a display 120, a sensor 130, a printed circuit board (PCB) 140, a power management integrated circuit (PMIC) 150, and a processor 160.

The display 120 includes a display panel 121, a polymer layer 122, a display driver integrated circuit (DDI) 123, and a flexible printed circuit board (module-flexible printed circuit board) 124.

The display panel 121 may have pixels P1, P2, P3, and P4. For example, the display panel 121 may have first pixel groups P1 and P2 and second pixel groups P3 and P4. The first pixel groups P1 and P2 may refer to pixels disposed in an area which corresponds to the sensor 130, and the second pixel groups P3 and P4 may refer to pixels disposed in an area which does correspond to the sensor 130. The first pixel group P1 and P2 and the second pixel group P3 and P4 may include substantially the same pixels.

According to an embodiment, the first pixel groups P1 and P2 may include a plurality of pixels P1 and P2. Each of the plurality of pixels P1 and P2 may include a plurality of sub-pixels R1, G1, B1, R2, G2, and B2. For example, the first pixel P1 may include a red sub-pixel R1, a green sub-pixel G1, and a blue sub-pixel B1. In the disclose, the description of the first pixel P1 may be applied to the second pixel P2. According to another embodiment, each of the plurality of pixels P1 and P2 may include a red sub-pixel, a green sub-pixel, a blue sub-pixel, and a green sub-pixel. According to another embodiment, each of the plurality of pixels P1 and P2 may include a red sub-pixel, a green sub-pixel, a blue sub-pixel, and a white sub-pixel.

The polymer layer 122 may be disposed in a −z direction of the display panel 121. The polymer layer 122 may include wiring to supply power and/or a signal to the display panel 121. According to one embodiment, the polymer layer 122, which is formed of a bendable material, may extend from one end of the display panel 121 to the flexible printed circuit board 124.

The DDI 123 may be disposed on a partial area of the polymer layer 122. The DDI 123 may control the first pixel group P1 and P2 through the polymer layer 122. For example, the DDI 123 may perform a control operation such that the leakage current flows out of the first pixel group P1 and P2, by turning on a specified transistor included in the first pixel group P1 and P2.

According to another embodiment, a film may be interposed between the DDI 123 and the polymer layer 122. In other words, the film may be attached to one end of the polymer layer 123, and the DDI 123 may be disposed on the film.

The flexible printed circuit board 124 may be electrically connected with a partial area of the polymer layer 122. For example, the flexible printed circuit board 124 may be electrically connected with a conductive pattern (or wiring) formed on the polymer layer 122. In the disclosure, the flexible printed circuit board 124 may be referred to as a module-flexible printed circuit board (M-FPCB).

The printed circuit board 140 may be disposed in a −z direction of the display panel 120. Various parts (e.g., the processor 160 and the memory) included in the electronic device 100 may be mounted on the printed circuit board 140.

The PMIC 150 may supply pixel power to the pixels P1, P2, P3, and P4. For example, the PMIC 150 may apply a first voltage (e.g., ELVDD) to one end of the pixels P1, P2, P3, and P4, and may apply a second voltage (e.g., ELVSS) to an opposite end of the pixels P1, P2, P3, and P4. The pixels receiving the pixel power may emit light.

The processor 160 (e.g., an application processor) may turn on the sensor 130 in response to a user input for recognizing biometric information. For example, when the user wants to unlock the screen, the processor 160 may control the sensor 130 (or light emitting device) to emit light in the infrared band. The light emitted from the sensor 130 may be reflected from the user body (e.g., an iris or a finger) and re-incident on the electronic device 100. The processor 160 may perform user authentication based on the received light. When the authentication result is matched to the user, the processor 160 may unlock the screen.

The processor 160 may turn on a specific transistor included in each of the first pixel group P1 and P2 when the sensor 130 (or the light emitting device) emits light in the infrared band. When the specific transistor is turned on, the current (or leakage current) generated by the sensor 130 may be discharged out of the first pixel group P1 and P2 through the specific transistor. According to an embodiment of the disclosure, the leakage current is discharged out of the first pixel group P1 and P2, thereby preventing the first pixel group P1 and P2 from being erroneously emitted or from being deteriorated.

Meanwhile, the embodiment illustrated in FIG. 2 is provided only for the illustrative purpose, and the stack structure of the electronic device 100 and the components included in the electronic device are not limited to those illustrated in FIG. 2. For example, the display 120 may be configured in a chip on film (COF) type in which various parts are disposed on a thin film, or in a chip on glass (COG) type in which the DDI 123 is directly mounted on a glass substrate.

Figure 9:
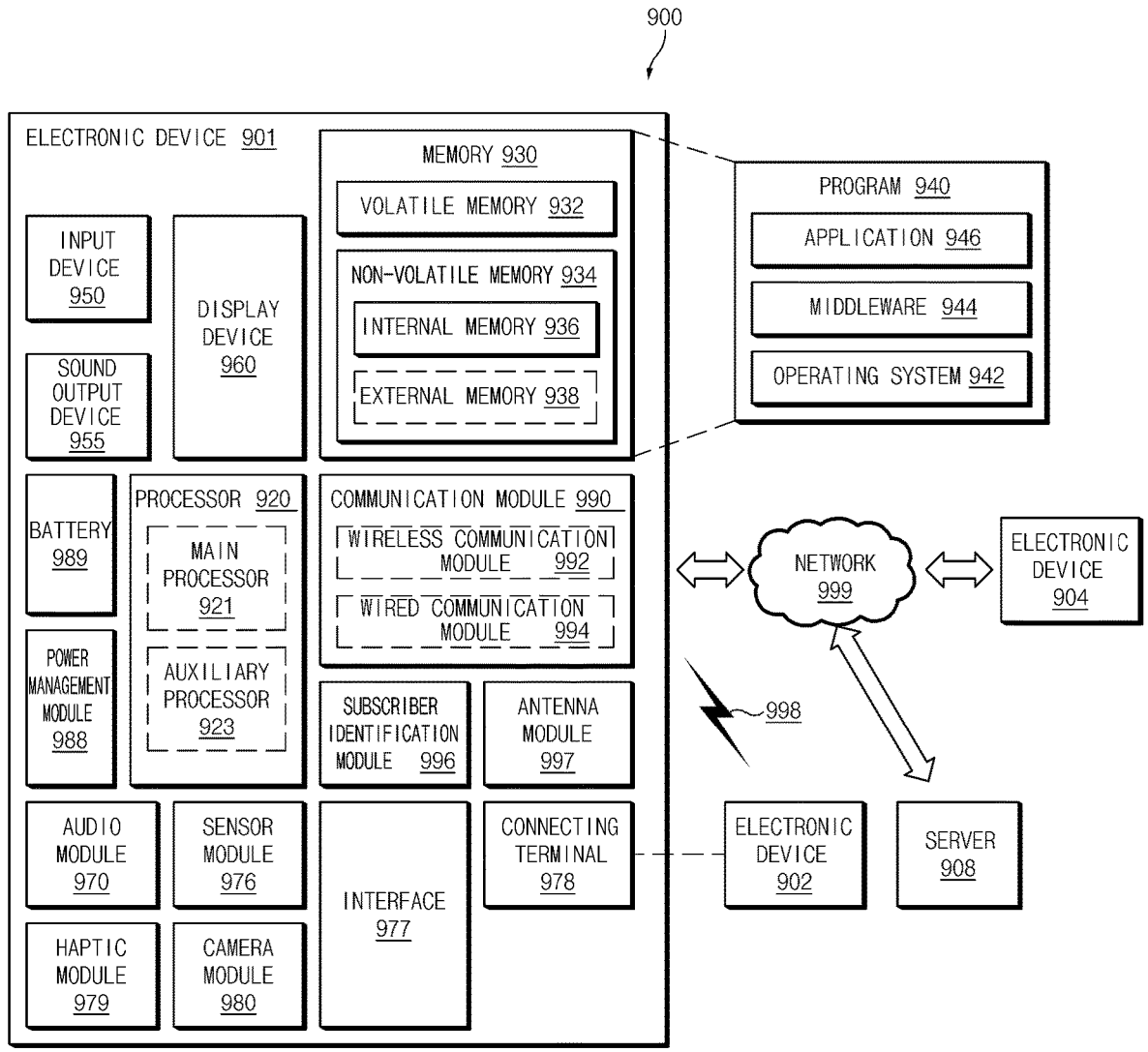
FIG. 9 is a block diagram of an electronic device in a network environment to reduce a leakage current, according to various embodiments.

According to an embodiment, the electronic device may include a memory (e.g., reference numeral 930 of FIG. 9). The memory may include instructions that may control the DDI 123 and/or the processor 160.

In the disclosure, components having the same reference numerals as those of components of the electronic device 100 illustrated in FIGS. 1 and 2 may have the same description as that made with reference to FIGS. 1 and 2. In addition, in the disclosure, the DDI 123 and/or the processor 160 may be referred to a control circuit.

Figure 3:
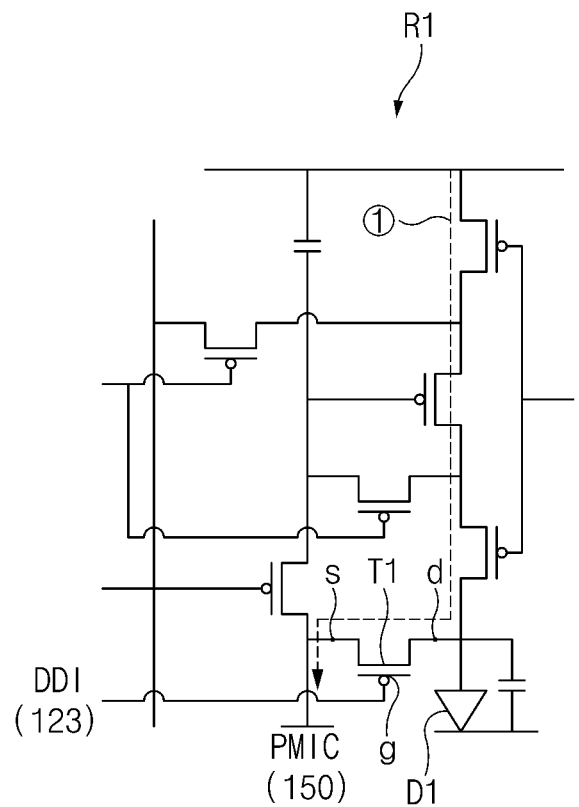
FIG. 3 illustrates an equivalent circuit diagram of a sub-pixel, according to an embodiment.

FIG. 3 illustrates an equivalent circuit diagram of a sub-pixel, according to an embodiment. FIG. 3 is an equivalent circuit diagram of a red sub-pixel R1 illustrated in FIG. 2. FIG. 3 is associated with an embodiment to discharge the leakage current out of the first pixel group P1 and P2.

Referring to FIG. 3, the red sub-pixel R1 may include a transistor T1 and an organic light emitting diode D1. Each of a gate 'g', a source 's', and a drain 'd' of the transistor T1 may be connected to the DDI 123, the PMIC 150, and the organic light emitting diode D1.

According to an embodiment, the processor 160 (or the control circuit) may turn on the sensor 130 in response to the user input for recognizing biometric information. When the sensor 130 is turned on, the current (or the leakage current) generated by the sensor 130 may flow through the red sub-pixel R1. In this case, the processor 160 may control the DDI 123 (or the control circuit) to apply a threshold voltage or more to the gate 'g' of the transistor T1. When the threshold voltage or more is applied, the transistor T1 may be turned on and the source 's' and the drain 'd' may be substantially the same node. Accordingly, the leakage current may be discharged to the PMIC 150 through the first path.

According to an embodiment of the disclosure, the leakage current is discharged to the PMIC 150 instead of flowing through the organic light emitting diode D1, thereby preventing the red sub-pixel R1 from erroneously emit light. According to an embodiment of the disclosure, the leakage current is discharged to the PMIC 150 instead of flowing through the organic light emitting diode D1, thereby preventing the red sub-pixel R1 from being deteriorated.

According to an embodiment, the description of the red sub-pixel R1 will be applied to the description of other sub-pixels G1, B1, R2, G2, and B2 included in the first pixel group P1 and P2. For example, when the sensor 130 is turned on the processor 160 may turn on a specific transistor (e.g., a transistor corresponding to transistor T1) included in each of the sub-pixels G1, B1, R2, G2, and B2. Accordingly, the leakage current may be discharged to the PMIC 150 through the specific transistor. According to an embodiment of the disclosure, the leakage current is discharged to the PMIC 150 instead of flowing through the organic light emitting diode, thereby preventing the first pixel group P1 and P2 from erroneously emitting light. According to an embodiment of the disclosure, the leakage current is discharged to the PMIC 150 instead of flowing through the organic light emitting diode D1, thereby preventing the first pixel group P1 and P2 from being deteriorated.

Figure 4:
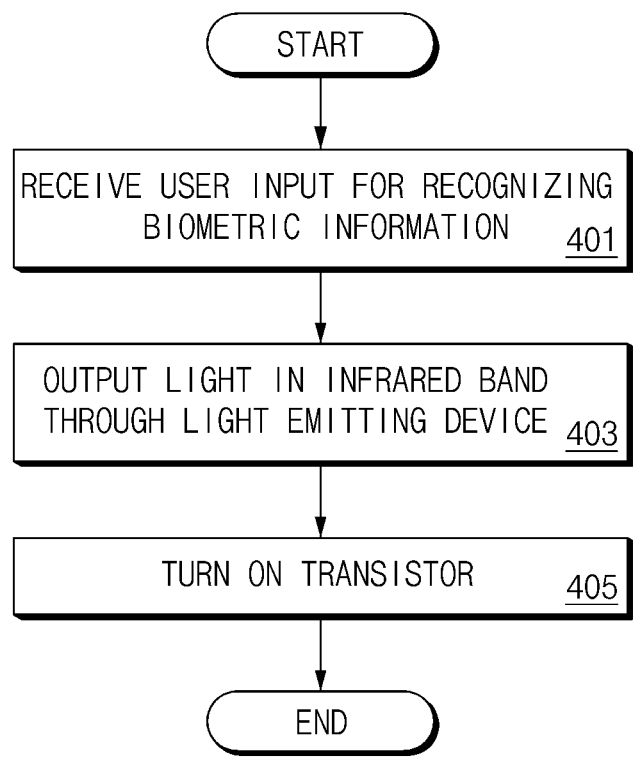
FIG. 4 illustrates an operating flowchart of an electronic device, according to an embodiment.

FIG. 4 illustrates an operating flowchart of an electronic device, according to an embodiment. FIG. 4 is a flowchart illustrating the operation of the electronic device 100 illustrated in FIG. 1.

Referring to FIG. 4, in operation 401, the electronic device 100 (or the control circuit) may receive a user input for recognizing biometric information. For example, when the user wants to unlock a locked screen, the electronic device 100 may receive a force touch of a user. The force touch may refer to that the user touches the display 120 or a home button with pressure of a specific intensity or more. According to another embodiment, when the user wants to perform the financial payment, the electronic device 100 may receive the touch input of the user. The touch input may refer to that the user touches to a payment icon.

In operation 403, the electronic device 100 (or the control circuit) may turn on the sensor 130. The sensor 130 (or the light emitting device) may emit light in the infrared band. For example, the electronic device 100 may turn on the iris sensor 130 and the iris sensor 130 may emit light in the infrared band. The emitted light may be reflected from the eyes of the user and incident onto the iris sensor 130. For another example, the electronic device 100 may turn on the fingerprint sensor 130 and the fingerprint sensor 130 may emit light in the infrared band. The emitted light may be reflected from a finger of the user and incident onto the fingerprint sensor 130.

In operation 405, the electronic device 100 (or the control circuit) may turn on a specific transistor (e.g., reference numeral T1 of FIG. 3) included in each of pixels (or the first pixel group P1 and P2) disposed on the sensor 130. When the specific transistor is turned on, the current (or leakage current) generated by the sensor 130 may be discharged out of the first pixel group P1 and P2.

According to another embodiment, the sensor 130 (e.g., the proximity sensor) may sense whether an external object (e.g., the face of the user) is in proximity to the electronic device 100. The sensor 130 (or the light emitting device) may emit light in the infrared band. The light emitted from the sensor 130 may be reflected from the external object and incident onto the electronic device 100. The electronic device 100 may sense whether the external object is in proximity to the electronic device 100, based on the reflected light. In this case, the electronic device 100 may turn on the specific transistor (e.g., reference numeral T1 of FIG. 3). When the specific transistor is turned on, the current (or leakage current) generated by the sensor 130 may be discharged out of the first pixel group P1 and P2.

The embodiment illustrated in FIG. 4 is provided only for the illustrative purpose, and the embodiments of the disclosure are not limited to the operating sequence illustrated in FIG. 4. For example, the electronic device 100 (or the control circuit) may turn on a specific transistor (e.g., reference numeral T1 of FIG. 3) included in each of pixels (or the first pixel group P1 and P2) disposed on the sensor 130, and may output light in the infrared band through the sensor 130 (or the light emitting device). When the specific transistor (e.g., reference numeral T1 of FIG. 3) is turned on, the current (or leakage current) generated by the sensor 130 may be discharged out of the first pixel group P1 and P2.

According to an embodiment of the disclosure, the processor 160 may control the first pixel group P1 and P2 such that the current (or the leakage current) generated by the sensor 130 is discharged out of the first pixel group P1 and P2. Accordingly, the first pixel group P1 and P2 may be prevented from erroneously emitting light or being deteriorated.

According to an embodiment, the electronic device 100 may include a memory (e.g., reference numeral 930 of FIG. 9). The memory may store instructions to control the operation of the control circuit. For example, the instruction may cause the control circuit to receive a user input for recognizing biometric information. When the user input is received, the instruction may control the sensor 130 (or the light emitting device) to output light in the infrared band and may turn on the transistor (e.g., reference numeral T1 of FIG. 3). Accordingly, the current generated by the sensor 130 may be discharged out of the transistor and the first pixel group P1 and P2.

Figure 5:
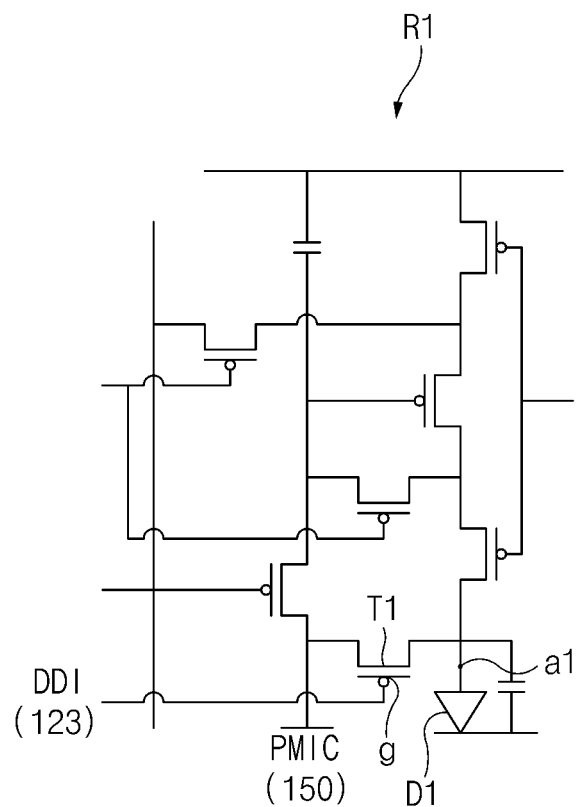
FIG. 5 illustrates an equivalent circuit diagram of a sub-pixel, according to another embodiment.

FIG. 5 illustrates an equivalent circuit diagram of a sub-pixel, according to another embodiment. FIG. 5 is an equivalent circuit diagram of a red sub-pixel R1 illustrated in FIG. 2. FIG. 5 is associated with an embodiment for initializing a voltage applied to an anode 'a1' of the organic light emitting diode D1.

Referring to FIG. 5, the processor 160 (or the control circuit) may control the DDI 123 to turn on the transistor T1 in response to the user input for recognizing the biometric information. In this case, the processor 160 may control the DDI 123 to apply a threshold voltage or more to the gate 'g' of the transistor T1. When the transistor T1 is turned on, the processor 160 may control the PMIC 150 to initialize a voltage applied to the anode 'a1' of the organic light emitting diode D1 through the transistor T1.

When the voltage applied to the anode 'a1' of the organic light emitting diode D1 is initialized, the processor 160 may turn on the sensor 130. Accordingly, the current (or the leakage current) may flow through the red sub-pixel R1. However, the voltage applied to the anode 'a1' of the organic light emitting diode D1 is initialized. Accordingly, even if the leakage current flows, the organic light emitting diode D1 does not emit light.

According to an embodiment, the description of the red sub-pixel R1 will be applied to the description of other sub-pixels G1, B1, R2, G2, and B2 included in the first pixel group P1 and P2. For example, the processor 160 may initialize the voltage applied to the anode of the organic light emitting diode included in each of the sub-pixels G1, B1, R2, G2, and B2, in response to the user input. Therefore, the first pixel group P1 and P2 may not emit light even if the leakage current flows.

According to an embodiment of the disclosure, even if the leakage current flows through the first pixel group P1 and P2, the processor 160 may not control the first pixel group P1 and P2 to prevent the first pixel group P1 and P2 from emitting light. Accordingly, the first pixel group P1 and P2 may be prevented from erroneously emitting light or being deteriorated.

Figure 6:
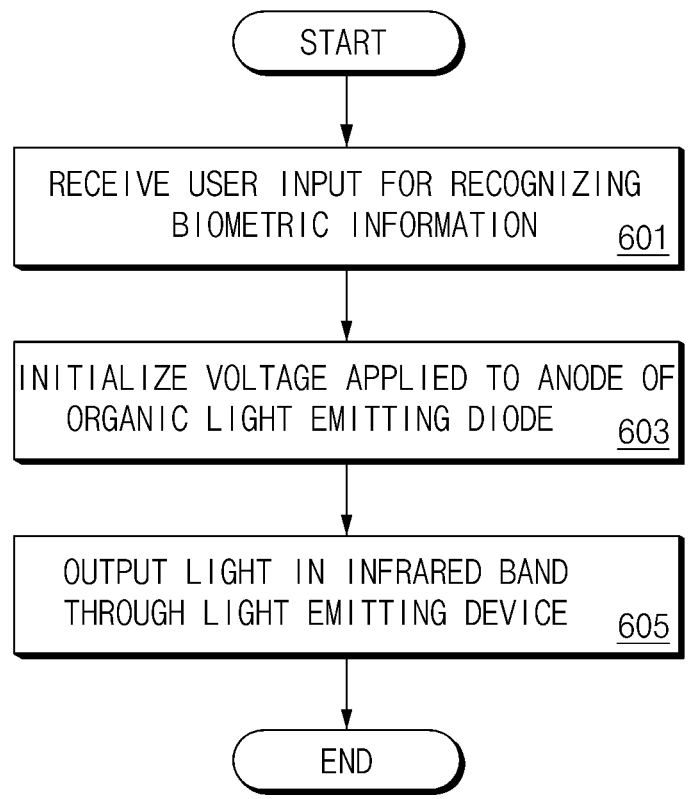
FIG. 6 illustrates an operating flowchart of an electronic device, according to another embodiment.

FIG. 6 illustrates an operating flowchart of an electronic device, according to another embodiment. FIG. 6 is a flowchart illustrating the operation of the electronic device 100 to initialize a voltage applied to the anode 'a1' of the organic light emitting diode D1.

Referring to FIG. 6, in operation 601, the electronic device 100 (or the control circuit) may receive a user input for recognizing biometric information. For example, when the user wants to unlock a screen, the electronic device 100 may receive a force touch of a user. The description of operation 401 illustrated in FIG. 4 may be applied to operation 601.

In operation 603, the electronic device 100 (or the control circuit) may initialize a voltage (or a voltage applied to a point connected to the transistor T1 and the organic light emitting diode D1) applied to an anode (e.g., reference numeral 'a1' of FIG. 5) of an organic light emitting diode included in each of the first pixel group P1 and P2. In this case, the electronic device 100 may control the DDI 123 to apply a threshold voltage or more to the gate 'g' of the transistor T1. When the transistor T1 is turned on, the electronic device 100 may control the PMIC 150 to initialize the voltage applied to the anode 'a1' of the organic light emitting diode D1 through the transistor T1.

In operation 605, the electronic device 100 may turn on the sensor 130. When the sensor 130 is turned on, the current (or the leakage current) generated by the sensor 130 may flow through the first pixel group P1 and P2. However, the voltage applied to the anode (e.g., reference numeral 'a1' of FIG. 5) of the organic light emitting diode is initialized, so the first pixel group P1 and P2 may not emit light.

According to another embodiment, the sensor 130 (e.g., the proximity sensor) may sense whether an external object (e.g., the face of the user) is in proximity to the electronic device 100. The sensor 130 (or the light emitting device) may emit light in the infrared band. The light emitted from the sensor 130 may be reflected from the external object and incident onto the electronic device 100. The electronic device 100 may sense whether the external object is in proximity to the electronic device 100, based on the reflected light. In this case, the electronic device 100 may initialize the voltage applied to an anode (e.g., reference numeral 'a1') of the organic light emitting diode included in each of the first pixel group P1 and P2 before the sensor 130 outputs the light in the infrared band. The voltage applied to the anode (e.g., reference numeral 'a1' of FIG. 5) of the organic light emitting diode is initialized, so the first pixel group P1 and P2 may not emit light even if the leakage current flows.

Figure 7:
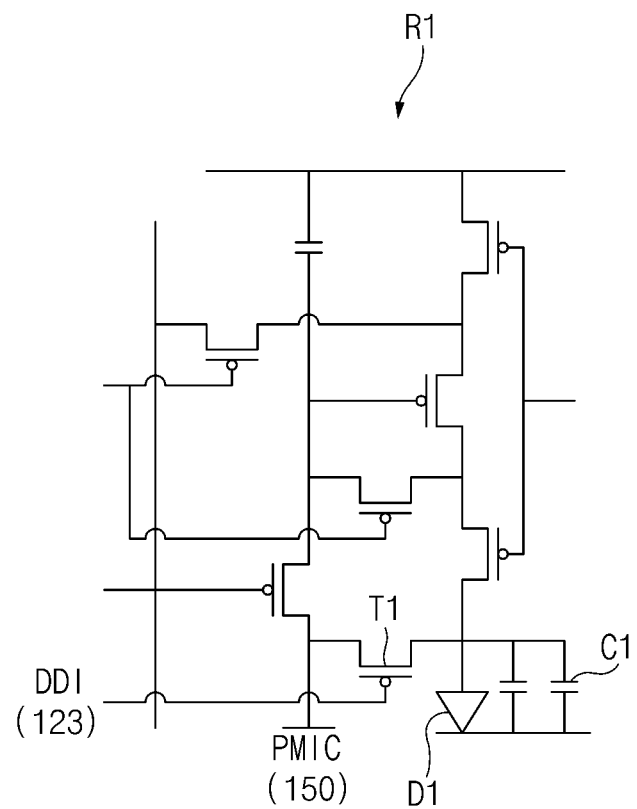
FIG. 7 illustrates an equivalent circuit diagram of a sub-pixel, according to another embodiment.

According to an embodiment of the disclosure, even if the leakage current flows through the first pixel group P1 and P2, the processor 160 may not control the first pixel group P1 and P2 to prevent the first pixel group P1 and P2 from emitting light. Accordingly, the first pixel group P1 and P2 may be prevented from erroneously emitting light or being deteriorated FIG. 7 illustrates an equivalent circuit diagram of a sub-pixel, according to another embodiment. FIG. 7 is an equivalent circuit diagram of a red sub-pixel R1 illustrated in FIG. 2. FIG. 7 is associated with an embodiment to maintain a voltage applied to the organic light emitting diode D1 by connecting a capacitive device C1 to the organic light emitting diode D1.

Referring to FIG. 7, the red sub-pixel R1 may include a capacitive device C1 (e.g., capacitor). The capacitive device C1 may be connected to the organic light emitting diode D1 in parallel. The capacitive device C1 may maintain the intensity of a voltage, which is applied to the organic light emitting diode D1, at a constant level.

According to an embodiment, the processor 160 may turn on the sensor 130 in response to the user input. When the sensor 130 is turned on, the current (or the leakage current) generated by the sensor 130 may flow through the red sub-pixel R1. However, the capacitive device C1 may maintain the voltage, which is applied to the organic light emitting diode D1, at the constant level, so the organic light emitting diode D1 may not emit light.

According to an embodiment, the description of the red sub-pixel R1 will be applied to the description of other sub-pixels G1, B1, R2, G2, and B2 included in the first pixel group P1 and P2. For example, other pixels G1, B1, R2, G2, and B2 may include the capacitive device C1. Accordingly, even if the leakage current flows through the first pixel group P1 and P2, the voltage, which is applied to the organic light emitting diode D1, may be maintained at the constant level, and the first pixel group P1 and P2 may not emit light.

According to an embodiment of the disclosure, the first pixel group P1 and P2 includes the capacitive device C1, so the first pixel group P1 and P2 may not emit light even if the leakage current flows through the first pixel group P1 and P2. Accordingly, the first pixel group P1 and P2 may be prevented from erroneously emitting light or being deteriorated.

Figure 8:
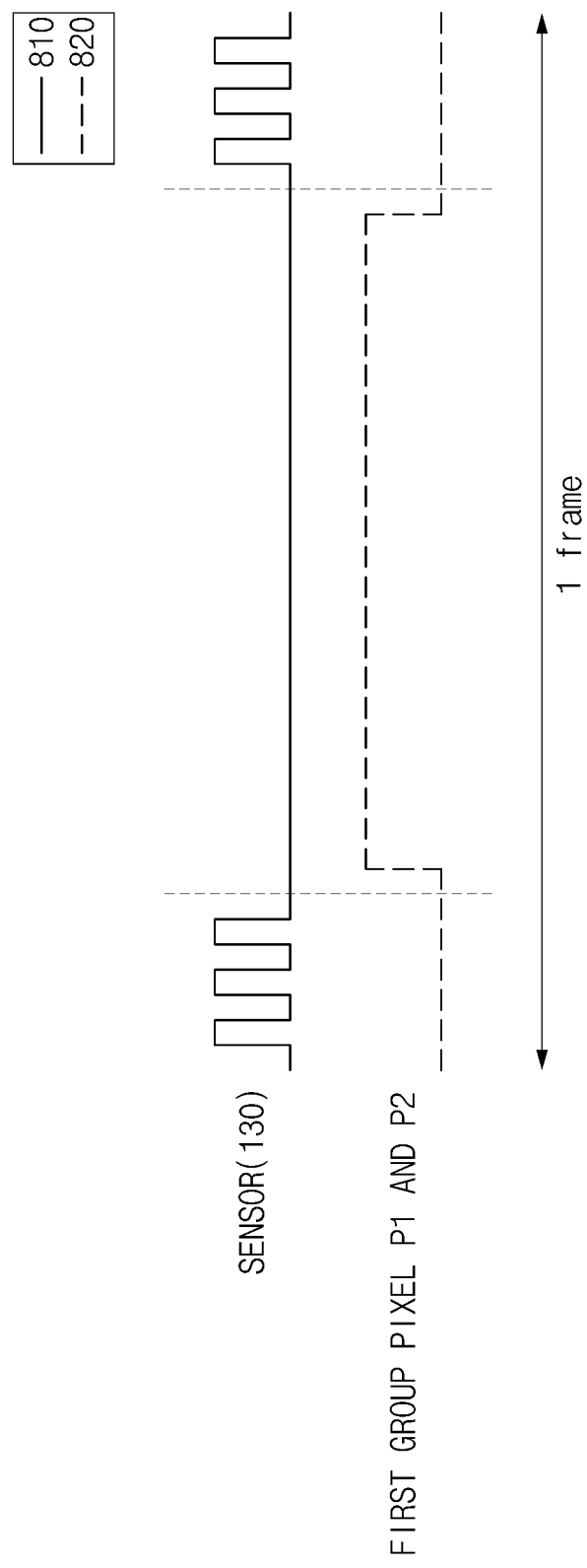
FIG. 8 illustrates an operating timing diagram of an electronic device, according to another embodiment.

FIG. 8 illustrates an operating timing diagram of an electronic device, according to another embodiment. FIG. 8 is associated with an embodiment in which timing, at which the sensor 130 is turned on, is different from timing at which the first pixel group P1 and P2 is turned on.

Referring to FIG. 8, graph 810 illustrates timing at which the sensor 130 is turned on or off. In graph 810, a high state indicates that the sensor 130 is turned on, and a low state indicates that the sensor 130 is turned off. Graph 820 illustrates timing at which the first pixel group P1 and P2 is turned on or off. In graph 820, a high state indicates that the first pixel group P1 and P2 is turned on, and a low state indicates that the first pixel group P1 and P2 is turned off.

When graph 810 is compared with graph 820, the electronic device 100 may turn on the sensor 130 in response to the user input. In this case, the electronic device 100 may turn off the first pixel group P1 and P2. For example, the electronic device 100 may turn off the first pixel group P1 and P2 by turning off a portion (e.g., an emission driver) of the DDI 123 connected to the first pixel group P1 and P2. To the contrary, the electronic device 100 may turn on the first pixel group P1 and P2 when the sensor 130 is turned off.

According to an embodiment, the electronic device 100 may control the sensor 130 and the first pixel group P1 and P2 such that the sensor 130 and the first pixel group P1 and P2 are alternately turned on during one frame (for about 16.67 ms). For example, the electronic device 100 may turn off the sensor 130 after turning on the sensor 130 for about 3 m. When the sensor 130 is turned off, the electronic device 100 may turn off the first pixel group P1 and P2 after turning on the first pixel group P1 and P2 for about 10 ms. Next, the electronic device 100 may turn on the sensor 130 for about 3 ms. The electronic device 100 may repeat the above-described operation during a next frame.

According to an embodiment of the disclosure, an amount of leakage current flowing through the first pixel group P1 and P2 may be reduced by controlling the timing, at which the first pixel group P1 and P2 is turned on, to be different from the timing at which the sensor 130 is turned on. Accordingly, the first pixel group P1 and P2 may be prevented from erroneously emitting light or being deteriorated.

According to another embodiment, the electronic device 100 (or the control circuit) may turn on a specific transistor (e.g., reference numeral T1 of FIG. 3) included in each of pixels (or the first pixel group P1 and P2) disposed on the sensor 130, at the timing at which the sensor 130 is turned on. In other words, the electronic device 100 may turn on a specific transistor (e.g., reference numeral T1 of FIG. 3 at timing at which the first pixel group P1 and P2 is turned off.

When the specific transistor is turned on, the current (or leakage current) generated by the sensor 130 may be discharged out of the first pixel group P1 and P2.

According to an embodiment, the electronic device 100 may include a memory (e.g., reference numeral 930 of FIG. 9). The memory may store an instruction to control the operation of the control circuit. For example, the instruction may control the sensor 130 (or the light emitting device) to output light in the infrared band. In this case, the instruction may turn off the first pixel group P1 and P2. To the contrary, the instruction may turn on the first pixel group P1 and P2 when the sensor 130 is turned off. According to an embodiment of the disclosure, an amount of leakage current flowing through the first pixel group P1 and P2 may be reduced by controlling the timing, at which the first pixel group P1 and P2 is turned on, to be different from the timing at which the sensor 130 is turned on. Accordingly, the first pixel group P1 and P2 may be prevented from erroneously emitting light or being deteriorated.

According to an embodiment of the disclosure, an electronic device may include a display including one or more pixels including an organic light emitting diode and a transistor connected to an anode of the organic light emitting diode, a light emitting device to output light in an infrared band, and at least one control circuit configured to turn on the transistor included in at least some of the one or more pixels included in the display such that a leakage current, which is applied to the organic light emitting diode by the light in the infrared band, flows through the transistor, when the light in the infrared band is output through the light emitting device.

According to an embodiment of the disclosure, the at least one control circuit may be configured to turn on the transistor at second timing synchronized with first timing at which the sensor is turned on.

According to an embodiment of the disclosure, the at least one control circuit may be configured to initialize, through the transistor, a voltage value at a point at which the transistor is connected to the organic light emitting diode.

According to an embodiment of the disclosure, at least some of the one or more pixels may further include a capacitive device connected to the organic light emitting diode in parallel.

According to an embodiment of the disclosure, the capacitive device may maintain a voltage value at a point, at which the transistor is connected to the organic light emitting diode, within a specified range.

According to an embodiment of the disclosure, the at least one control circuit may be configured to turn off at least some of the one or more pixels during a time at which the light emitting device is turned on.

According to an embodiment of the disclosure, the at least one control circuit may be configured to turn off the light emitting device during a time at which at least some of the one or more pixels is turned on.

According to an embodiment of the disclosure, the electronic device may further include a power management integrated circuit (PMIC) configured to supply pixel power to at least some of the one or more pixels.

According to an embodiment of the disclosure, the PMIC may be electrically connected with the transistor, and the leakage current may flow through the PMIC through the transistor.

According to an embodiment of the disclosure, the at least one control circuit may include at least one of an application processor (AP) or a display driver integrated circuit (DDI).

According to an embodiment of the disclosure, the light emitting device may include at least one of a proximity sensor, an iris sensor, or a fingerprint sensor.

According to an embodiment of the disclosure, the light emitting device may further output light in a specified band.

According to an embodiment of the disclosure, the at least one control circuit may be configured to unlock a locked screen or perform a financial payment, based on information obtained through the light emitting device.

According to an embodiment of the disclosure, an electronic device may include a display including one or more pixels including an organic light emitting diode and a transistor connected to an anode of the organic light emitting diode, a light emitting device to output light in an infrared band, and a PMIC electrically connected to at least some of the one or more pixels included in the display, and at least one control circuit configured to turn on the transistor, and to control the PMIC to initialize, through the transistor, a voltage value at a point at which the transistor is connected to the organic light emitting diode, when the light in the infrared band is to be output through the light emitting device.

According to an embodiment of the disclosure, at least some of the one or more pixels may further include a capacitive device connected to the organic light emitting diode in parallel.

According to an embodiment of the disclosure, the capacitive device may maintain a voltage value at a point, at which the transistor is connected to the organic light emitting diode, within a specified range.

According to an embodiment of the disclosure, the at least one control circuit may be configured to turn off at least some of the one or more pixels during a time at which the sensor is turned on.

According to an embodiment of the disclosure, the at least one control circuit may include at least one of an application processor (AP) or a display driver integrated circuit (DDI).

According to an embodiment of the disclosure, the light emitting device may include at least one of a proximity sensor, an iris sensor, or a fingerprint sensor.

According to an embodiment of the disclosure, the light emitting device may further output light in a specified band.

According to an embodiment of the disclosure, an electronic device may include a display including one or more pixels including an organic light emitting diode and a transistor connected to an anode of the organic light emitting diode, a light emitting device to output light in an infrared band, a memory to store an instruction, and a control circuit. The instruction may cause the control circuit to when executed, turn on the transistor when the light in the infrared band is output through the light emitting device, based at least on receiving a user input for recognizing biometric information.

According to an embodiment of the disclosure, the instruction may cause the control circuit to when executed, turn on the transistor included in at least some of the one or more pixels included in the display, such that a leakage current, which may be applied to the organic light emitting diode by the light in the infrared band, flows through the transistor.

According to an embodiment of the disclosure, the instruction may cause the control circuit to when executed, turn off pixels, which are disposed in an area corresponding to the light emitting device, the one or more pixels when the organic light emitting diode is turned on.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Figure 10:
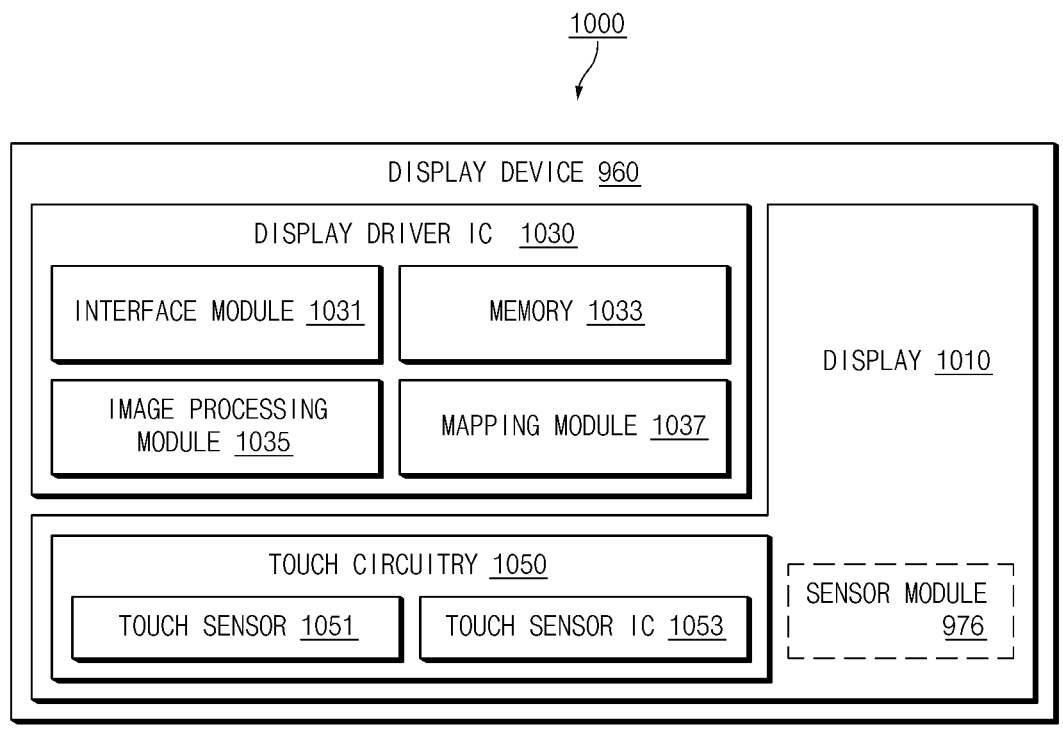
FIG. 10 is a block diagram illustrating a display device to reduce a leakage current, according to various embodiments.

FIG. 10 is a block diagram 1000 illustrating the display device 960 according to various embodiments. Referring to FIG. 10, the display device 960 may include a display 1010 and a display driver integrated circuit (DDI) 1030 to control the display 1010. The DDI 1030 may include an interface module 1031, memory 1033 (e.g., buffer memory), an image processing module 1035, or a mapping module 1037. The DDI 1030 may receive image information that contains image data or an image control signal corresponding to a command to control the image data from another component of the electronic device 901 via the interface module 1031. For example, according to an embodiment, the image information may be received from the processor 920 (e.g., the main processor 921 (e.g., an application processor)) or the auxiliary processor 923 (e.g., a graphics processing unit) operated independently from the function of the main processor 921. The DDI 1030 may communicate, for example, with touch circuitry 950 or the sensor module 976 via the interface module 1031. The DDI 1030 may also store at least part of the received image information in the memory 1033, for example, on a frame by frame basis.

The image processing module 1035 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1010.

The mapping module 1037 may generate a voltage value or a current value corresponding to the image data pre-processed or post-processed by the image processing module 1035. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

According to an embodiment, the display device 960 may further include the touch circuitry 1050. The touch circuitry 1050 may include a touch sensor 1051 and a touch sensor IC 1053 to control the touch sensor 1051. The touch sensor IC 1053 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electric charges) corresponding to the certain position on the display 1010. The touch circuitry 1050 may provide input information (e.g., a position, an area, a pressure, or a time) indicative of the touch input or the hovering input detected via the touch sensor 1051 to the processor 920. According to an embodiment, at least part (e.g., the touch sensor IC 1053) of the touch circuitry 1050 may be formed as part of the display 1010 or the DDI 1030, or as part of another component (e.g., the auxiliary processor 923) disposed outside the display device 960.

According to an embodiment, the display device 960 may further include at least one sensor (e.g., a fingerprint sensor, an iris sensor, a pressure sensor, or an illuminance sensor) of the sensor module 976 or a control circuit for the at least one sensor. In such a case, the at least one sensor or the control circuit for the at least one sensor may be embedded in one portion of a component (e.g., the display 1010, the DDI 1030, or the touch circuitry 950)) of the display device 960. For example, when the sensor module 976 embedded in the display device 960 includes a biometric sensor (e.g., a fingerprint sensor), the biometric sensor may obtain biometric information (e.g., a fingerprint image) corresponding to a touch input received via a portion of the display 1010. As another example, when the sensor module 976 embedded in the display device 960 includes a pressure sensor, the pressure sensor may obtain pressure information corresponding to a touch input received via a partial or whole area of the display 1010. According to an embodiment, the touch sensor 1051 or the sensor module 976 may be disposed between pixels in a pixel layer of the display 1010, or over or under the pixel layer.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a light emitting device configured to output light in an infrared band;
   a display including at least one pixel disposed in an area corresponding to the light emitting device; and
   at least one control circuit operatively connected to the light emitting device and the display,
   wherein the at least one pixel includes an organic light emitting diode and a transistor connected to the organic light emitting diode, and
   wherein the at least one control circuit is configured to:
      output light in the infrared band through the light emitting device in response to a user input for recognizing biometric information; and
      turn on the transistor such that a leakage current, which is applied to the organic light emitting diode by the outputted light in the infrared band, flows through the transistor.

2. The electronic device of claim 1, wherein the at least one control circuit is configured to:
   turn on the transistor at second timing synchronized with first timing at which the light emitting device is turned on.

3. The electronic device of claim 2, wherein the at least one control circuit is configured to:
   initialize, through the transistor, a voltage value at a point at which the transistor is connected to the organic light emitting diode.

4. The electronic device of claim 1, wherein the at least one pixel further includes:
   a capacitive device connected to the organic light emitting diode in parallel.

5. The electronic device of claim 4, wherein the capacitive device maintains a voltage value at a point, at which the transistor is connected to the organic light emitting diode, within a specified range.

6. The electronic device of claim 1, wherein the at least one control circuit is configured to:
   turn off the at least one pixel during a time period at which the light emitting device is turned on.

7. The electronic device of claim 6, wherein the at least one control circuit is configured to:
   turn off the light emitting device during a time period at which the at least one pixel is turned on.

8. The electronic device of claim 1, further comprising:
   a power management integrated circuit (PMIC) configured to:
   supply pixel power to the at least one pixel.

9. The electronic device of claim 8, wherein the PMIC is electrically connected with the transistor, and
   wherein the leakage current flows through the PMIC through the transistor.

10. The electronic device of claim 1, wherein the at least one control circuit includes:
    at least one of an application processor (AP) or a display driver integrated circuit (DDI).

11. The electronic device of claim 1, wherein the light emitting device may include at least one of a proximity sensor, an iris sensor, or a fingerprint sensor.

12. The electronic device of claim 1, wherein the at least one control circuit is configured to:
unlock a locked screen or perform a financial payment, based on information obtained through the light emitting device.

13. An electronic device comprising:
a light emitting device configured to output light in an infrared band;
a display including at least one pixel disposed in an area corresponding to the light emitting device;
a PMIC electrically connected to the at least one pixel; and
at least one control circuit operatively connected to the light emitting device, the display, and the PMIC,
wherein the at least one pixel includes an organic light emitting diode and a transistor connected to the organic light emitting diode, and
wherein the at least one control circuit is configured to:
turn on the transistor, and control the PMIC to initialize, through the transistor, a voltage value at a point at which the transistor is connected to the organic light emitting diode, when light in the infrared band is to be output through the light emitting device.

14. The electronic device of claim 13, wherein the at least one pixel further includes:
a capacitive device connected to the organic light emitting diode in parallel.

15. The electronic device of claim 14, wherein the capacitive device maintains a voltage value at a point, at which the transistor is connected to the organic light emitting diode, within a specified range.

* * * * *